US006064915A

United States Patent [19]

Kaneko et al.

[11] Patent Number: 6,064,915

[45] Date of Patent: *May 16, 2000

[54] EQUIPMENT CONTROL APPARATUS

[75] Inventors: Tokuharu Kaneko; Masanori Miyata, both of Yokohama; Hideki Adachi; Shinichi Nakamura, both of Kawasaki; Naoyuki Ohki, Yokohama; Satoshi Kuroyanagi; Hiroshi Ozaki, both of Tokyo; Hisatsugu Tahara; Satoshi Kaneko, both of Kawasaki; Taisei Fukada, Tokyo; Mitsuharu Takizawa, Fuchu, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,891

[22] Filed: Feb. 10, 1997

Related U.S. Application Data

[63] Continuation of application No. 08/405,916, Mar. 16, 1995, abandoned, which is a continuation of application No. 07/870,664, Apr. 17, 1992, abandoned.

[30] Foreign Application Priority Data

| | | | |
|---|---|---|---|
| Apr. 18, 1991 | [JP] | Japan | 3-085604 |
| Apr. 18, 1991 | [JP] | Japan | 3-085611 |
| Apr. 18, 1991 | [JP] | Japan | 3-085612 |

[51] Int. Cl.$^7$ .................... G05B 15/00

[52] U.S. Cl. .................... 700/9; 399/8; 379/93.02

[58] Field of Search .................... 340/825.31, 825.34, 340/825.35; 379/93.02–93.04, 93.12; 399/8, 9; 700/2, 3, 9, 79–82, 231, 236, 237, 244

[56] References Cited

U.S. PATENT DOCUMENTS

| | | | |
|---|---|---|---|
| 3,305,839 | 2/1967 | Looschen et al. | 340/172.5 |
| 3,623,013 | 11/1971 | Perkins et al. | 340/172.5 |
| 3,638,191 | 1/1972 | Mann | 340/163 |
| 3,656,145 | 4/1972 | Proops | 340/310 |

(List continued on next page.)

FOREIGN PATENT DOCUMENTS

| | | | |
|---|---|---|---|
| 0121332 | 10/1984 | European Pat. Off. . | |
| 0342910 | 11/1989 | European Pat. Off. | G03G 15/00 |
| 2605119 | 4/1988 | France | G06F 3/05 |

(List continued on next page.)

OTHER PUBLICATIONS

Telecommunications, "Securing Dial–up Networks" Holmes Mar. 1984, pp. 84 and 124.

Xerox 1090 Copier Electronic Date Interface Operator Guide Nov 1988.

Kodak Ektaprint Brochure, Copyright, Eastman Kodak Company, 1986.

Smith, "Shared Line Billing and Data Interface," Xerox Disclosure Journal, vol. 12, No. 6, Nov./Dec. 1987.

J.D. Schoeffler, "IBM Series 1/The Small Computer Concept," IBM Corp. General Systems Division, pp. 386–423 (1978).

*Primary Examiner*—William Grant
*Assistant Examiner*—Steven R. Garland
*Attorney, Agent, or Firm*—Fitzpatrick, Cella, Harper & Scinto

[57] ABSTRACT

An equipment control apparatus in a system having an input unit for entering data on the conditions of equipment from the equipment, a communication unit for communicating with the apparatus located at a distance, and a control unit for exerting control in such a way as to transmit the data to the apparatus located at a distance through the steps of interrupting communication once on receiving a call from the apparatus requesting the data and then calling the apparatus located at a distance via the communication unit.

9 Claims, 8 Drawing Sheets

U.S. PATENT DOCUMENTS

| | | | |
|---|---|---|---|
| 3,842,408 | 10/1974 | Wells | 340/216 |
| 3,858,181 | 12/1974 | Goldsby et al. | 340/150 |
| 3,916,177 | 10/1975 | Greenwald | 235/153 |
| 3,984,032 | 10/1976 | Hyde et al. | 222/26 |
| 3,997,873 | 12/1976 | Thornton | 340/149 R |
| 4,071,911 | 1/1978 | Mazur | 364/900 |
| 4,124,887 | 11/1978 | Johnson et al. | 364/107 |
| 4,144,550 | 3/1979 | Donohue et al. | 364/107 |
| 4,167,322 | 9/1979 | Yano et al. | 355/3 R |
| 4,188,668 | 2/1980 | Finlay | 364/900 |
| 4,199,100 | 4/1980 | Wostl et al. | 235/381 |
| 4,283,709 | 8/1981 | Lucero et al. | 340/147 R |
| 4,290,123 | 9/1981 | Bare et al. | 371/29 |
| 4,300,040 | 11/1981 | Gould et al. | 235/381 |
| 4,311,986 | 1/1982 | Yee | 340/825.63 |
| 4,312,066 | 1/1982 | Bantz et al. | 371/16 |
| 4,314,334 | 2/1982 | Daughton et al. | 364/200 |
| 4,358,756 | 11/1982 | Morel et al. | 340/539 |
| 4,369,442 | 1/1983 | Werth et al. | 340/825.35 |
| 4,432,090 | 2/1984 | da Silva | 371/32 |
| 4,455,453 | 6/1984 | Parasekvakos et al. | 179/2 |
| 4,456,790 | 6/1984 | Soyack | 179/18 ES |
| 4,477,901 | 10/1984 | Braband et al. | 371/15 |
| 4,496,237 | 1/1985 | Schron | 355/14 C |
| 4,497,037 | 1/1985 | Kato et al. | 364/900 |
| 4,501,485 | 2/1985 | Tsudaka | 355/6 |
| 4,506,974 | 3/1985 | Sugiura et al. | 355/14 R |
| 4,509,851 | 4/1985 | Ippolito et al. | 355/14 C |
| 4,510,491 | 4/1985 | Prato | 340/792 |
| 4,520,233 | 5/1985 | Smith | 379/95 |
| 4,523,299 | 6/1985 | Donohue et al. | 364/900 |
| 4,545,013 | 10/1985 | Lyon et al. | 364/200 |
| 4,549,044 | 10/1985 | Durham | 179/5 R |
| 4,574,283 | 3/1986 | Arakawa et al. | 340/825.08 |
| 4,578,538 | 3/1986 | Pascucci et al. | 179/2 DP |
| 4,583,834 | 4/1986 | Seko et al. | 355/14 C |
| 4,595,921 | 6/1986 | Wang et al. | 340/825 |
| 4,611,205 | 9/1986 | Eglise | 340/825 |
| 4,630,042 | 12/1986 | Kawasaki et al. | 340/825 |
| 4,633,412 | 12/1986 | Ebert, Jr. et al. | 364/493 |
| 4,634,258 | 1/1987 | Tanaka et al. | 355/4 |
| 4,639,889 | 1/1987 | Matsumoto et al. | 364/900 |
| 4,652,698 | 3/1987 | Hale et al. | 380/24 |
| 4,654,800 | 3/1987 | Hayashi et al. | 364/479 |
| 4,658,243 | 4/1987 | Kimura et al. | 340/505 |
| 4,708,469 | 11/1987 | Bober et al. | 355/77 |
| 4,709,149 | 11/1987 | Takahashi et al. | 250/317 |
| 4,712,213 | 12/1987 | Warwick et al. | 371/15 |
| 4,723,212 | 2/1988 | Mindrum et al. | 364/401 |
| 4,742,483 | 5/1988 | Morrell | 364/900 |
| 4,745,602 | 5/1988 | Morrell | 371/20 |
| 4,752,950 | 6/1988 | Le Carpentier | 379/106 |
| 4,760,330 | 7/1988 | Lias, Jr. | 324/73 R |
| 4,766,548 | 8/1988 | Cedrone et al. | 364/479 |
| 4,823,343 | 4/1989 | Takahashi | 371/16 |
| 4,845,483 | 7/1989 | Negishi | 340/825 |
| 4,916,607 | 4/1990 | Teraichi et al. | 364/200 |
| 4,947,397 | 8/1990 | Sobel et al. | 371/16.4 |
| 4,962,368 | 10/1990 | Dobrzanski et al. | 340/514 |
| 4,991,114 | 2/1991 | Kamamura et al. | 364/519 |
| 5,077,582 | 12/1991 | Kravette et al. | 355/206 |
| 5,084,875 | 1/1992 | Weinberger et al. | 371/291 |
| 5,093,856 | 3/1992 | Atkinson et al. | 379/95 |

FOREIGN PATENT DOCUMENTS

| | | | |
|---|---|---|---|
| 56-27161 | 3/1981 | Japan . | |
| 59-22475 | 2/1984 | Japan . | |
| 59-81656 | 5/1984 | Japan . | |
| 59-89067 | 5/1984 | Japan . | |
| 59-91456 | 5/1984 | Japan . | |
| 59-116761 | 11/1984 | Japan . | |
| 60-101664 | 6/1985 | Japan . | |
| 60-230167 | 11/1985 | Japan . | |
| 62-84653 | 4/1987 | Japan . | |
| 63-122349 | 5/1988 | Japan . | |
| 1-137867 | 5/1989 | Japan | 379/95 |

EQUIPMENT CONTROL APPARATUS

This application is a continuation of application Ser. No. 08/405,916 filed Mar. 16, 1995, now abandoned, which is a continuation of application Ser. No. 07/870,664 filed Apr. 17, 1992, now abandoned.

BACKGROUND OF THE INVENTION

1. Field of the Invention

The present invention relates to an equipment control apparatus for transmitting data on equipment conditions to a centralized control unit by means of communication.

2. Related Background Art

A demand for copying machines provided with various additional functions and their sophistication is on the increase. As copying machines become complicated in not only construction but also function and as the number of copying machines in a business increases, the tendency is for the normal operating condition of and functional data on the copying machines to be kept under the centralized control of the administrative division of such a business or the specialized trade in order to facilitate proper maintenance and repair work, to say nothing of control of the use and operation of them.

For the reason stated above, known copying machines, as disclosed, for example, in U.S. Pat. No. 5,084,875, are equipped with communication control means for keeping communication with external units through communication circuits so that data can be exchanged, periodically or whenever necessary, with the external units installed in the administrative division or other places.

When a sort of copying machine proposed is requested to start communication through a communication circuit, it is so designed as to start communication on condition that an access is judged licit after an identification code (hereinafter called ID) and a password are checked.

Notwithstanding, an illicit access may be gained in case the ID and the password have leaked out because an ID as well as a password is only the way of recognizing a partner requesting a communication start and this has posed a serious problem in keeping secrecy. It is also necessary to provide means for storing IDs and passwords of authorized partners on the part of a copying machine to accept any request for a communication start.

The means for recognizing a request for a communication start operates to recognize the request therefor according to a specific protocol after identifying the ID and password of a partner requesting a communication start. Consequently, the necessity of providing IDs and passwords, decision means and procedures tends to complicate the construction and control of such means. Moreover, the problem is that an improper access may be gained when the IDs and the passwords have leaked out.

SUMMARY OF THE INVENTION

An object of the present invention is to provide an equipment control apparatus free from shortcomings deriving from the foregoing problems.

A further object of the present invention is to provide an improved equipment control apparatus.

Another object of the present invention is to provide an apparatus effective in excluding improper access to ensure secrecy.

An additional object of the present invention is to provide an apparatus effective in excluding improper access and detecting any request for a communication start through a simple procedure to ensure data transmission to only a predetermined communication partner and secrecy to a large extent.

Still another object of the present invention is to provide an apparatus capable of transmitting data through an external communication circuit by identifying a partner requesting a communication start each time the request is made by means of an ID and a password without relying on a specific protocol for recognition and while excluding an improper request for a communication start, making certain of a proper partner requesting such a communication start using simple means.

Other objects and features of the present invention may best be understood by reference to the following description taken in connection with the accompanying drawings.

DESCRIPTION OF THE PREFERRED EMBODIMENTS

Referring to embodiments, copying machines according to the present invention will subsequently be described.

Figure 1:
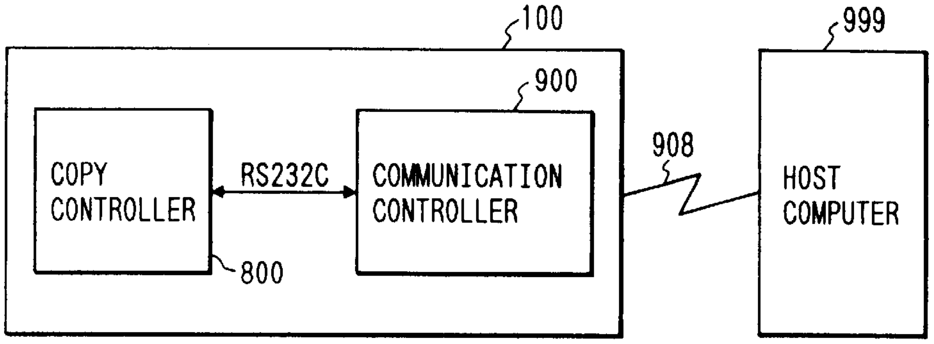
FIG. 1 is a schematic block diagram illustrating a system configuration of the present invention.

FIG. 1 is a block diagram illustrating the configuration of a copying machine embodying the present invention.

In FIG. 1, numeral 100 denotes a copying machine body (copier), 800 a copy controller for controlling copying operations, 900 a communication controller (a modem board) for the transmission and reception of data with an external communication circuit, 908 a public line of telecommunication as a communication circuit, and 999 a host computer as an external unit installed in an administrative section or the like and used for controlling the operation of the copying machine 100.

Under the control of the copy controller 800 and the communication controller 900, the copying operation of the copying machine 100, data storage and communication with the external unit 999 via the external communication circuit 908 are performed.

A description will subsequently be given of the copy controller 800 and the communication controller 900.

Figure 2:
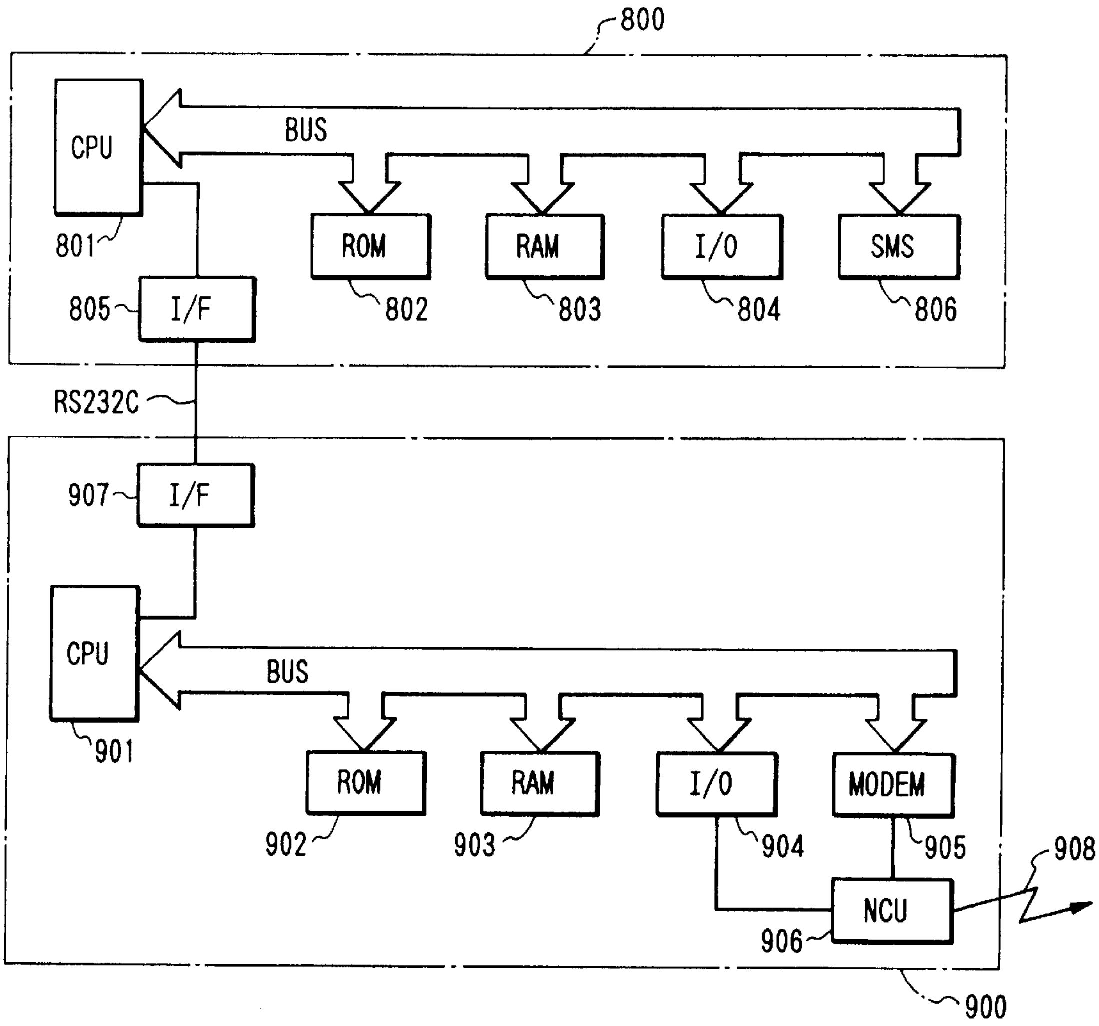
FIG. 2 is a block diagram illustrating a copy controller 800 and a communication controller 900.

FIG. 2 is a block diagram illustrating the copy controller 800 and the communication controller 900.

In FIG. 2, numeral 801 denotes a central arithmetic processing unit (hereinafter called CPU) for controlling the whole copying machine, and 802 a read only memory (ROM) stored with the steps (a control program) of controlling the copying machine 100. CPU 801 controls each component unit connected thereto via a bus in conformity with the programed steps stored in the ROM 802.

Moreover, the CPU 801 also functions as what detects whether or not the copying machine 100 is in a state·condition ready for data transmission toward the external unit.

Numeral 803 denotes a random access memory (hereinafter called RAM) as a main storage for use as a work storage area and for use in storing input/output data including telephone numbers necessary for starting communication with the external unit 999.

The RAM 803 stores a plurality of kinds of data to be transmitted to the external unit 999.

Numeral 804 denotes an input/output unit (hereinafter called I/O) which applied a control signal of the CPU 801 to the load of a main motor 113 and the like and transmits to the CPU 801 the signal received from the sensor or the like of a fixer.

The CPU 801 holds a set value on copying frequency corresponding to each of the kinds of the abovementioned data stored in the RAM 803 and compares the set value with a coefficient value of copying frequency counted correspondingly to each set value thereon.

Numeral 806 denotes a service mode switch for use in selecting, changing and reentering the set value of copying frequency. In addition, on receiving signals from various sensors, the CPU 801 checks the consumption, replacement and supplement of consumables.

The communication controller 900 for controlling communication with the communication circuit 908 is controlled by an internal CPU 901. Numeral 902 denotes a read only memory (ROM) for storing communication control, connection procedure programs and the like. The copy controller 800 of the copying machine body 100 and the communication controller 900 are connected via RS-232C interfaces 805, 907. When data is transferred from the copy controller 800 of the copying machine body 100 via the RS-232C interface 907, the data thus transferred is temporarily held in RAM 903 provided in the communication controller 900. The CPU 901 controls NCU (network control unit) 906 when data transfer from the copy controller 800 is completed and connects the communication circuit to the external unit 999 so as to transfer the data outside via NCU 906.

When data is otherwise transferred from the external unit 999, the data thus transferred is temporarily held in the RAM 903 before being transferred to the copy controller 800 via the RS-232C interfaces 805, 907 by request from the copy controller 800.

In this case, the data means the data and information stored in the RAM 803 as data storage means and the request for data transfer includes what is made at the time copy control irregularities or clogging with paper arise on the copying machine side, at regular report time of the copying machine, and during a control process as will be described later, and what is made when data are collected on the external administrative side.

Figure 3:
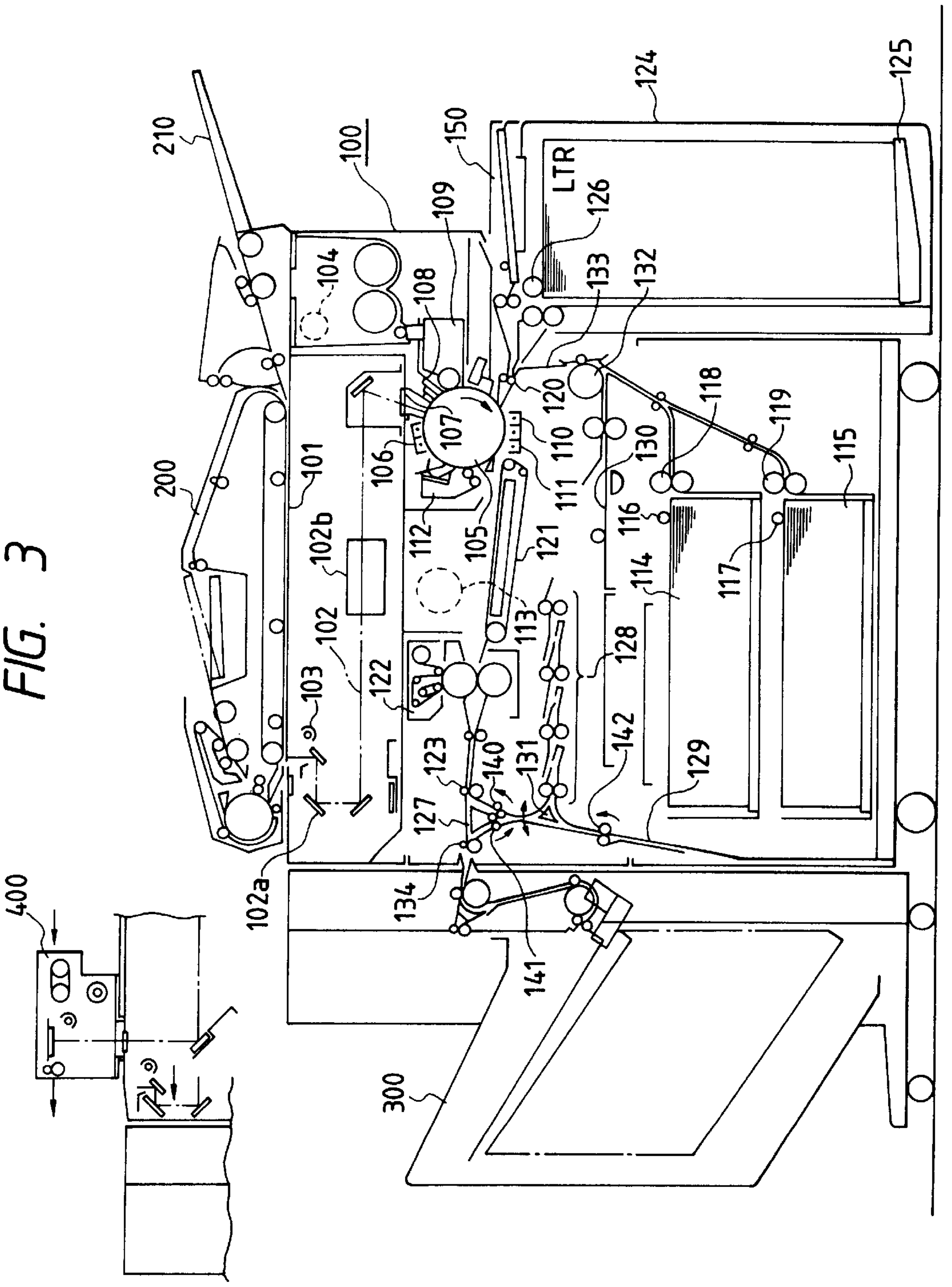
FIG. 3 is a sectional view of a copying machine embodying the present invention.

FIG. 3 is a sectional view of the copying machine 100 illustrative of its configuration, which together with the operation will be described.

Numeral 100 denotes the copying machine body 100, 200 a recurring automatic document feeder (RDF) for automatically feeding originals, 300 a sorter for sorting sheets of paper copied, 400 an automatic computer form feeder (CFF). RDF 200, the sorter 300 and the CFF 400 may freely be attached in combination to the copying machine body 100.

The configuration of the copying machine body 100 will subsequently be described.

In FIG. 3, numeral 101 denotes an original glass plate for mounting an original, 102 an optical system for reading the original, the optical system being composed of an exposure lamp 103 for irradiating the original, a scanning mirror 102*a,* a lens 102*b,* a motor 104 and the like. While the scanning mirror 102*a,* the lens 102*b* and the exposure lamp 103 are kept moving by the motor 104, the exposure lamp 103 is employed for irradiating the original and the light reflected from the original is caused to irradiate a photoreceptor drum 105 via the scanning mirror 102*a* and the lens 102*b*.

There are installed a high voltage unit 106, a blank exposure unit 107, a potential sensor 108, a developer 109, a transfer charger 110, a separation charger 111, and a cleaning device 112 around the photoreceptor drum 105, these in combination being used to record an image on the paper supplied.

The photoreceptor drum 105 is rotated by the main motor 113 in the direction of an arrow and kept charged by the high voltage unit 106 with corona charging. When the photoreceptor drum 105 is irradiated with the light reflected from the original via the optical system 102, an electrostatic latent image is formed thereon. The electrostatic latent image is developed by the developer 109 into a visual toner image.

On the other hand, transfer paper separated by pickup rollers 116, 117 from an upper row cassette 114 or a lower row cassette 115 and conveyed by paper feed rollers 118, 119 into the machine body 100 is fed to the photoreceptor drum 105 at such timing that a resist roller 120 makes the leading end of the transfer paper conform to that of the toner image on the photoreceptor drum 105. The toner image on the photoreceptor drum 105 is thus transferred by the transfer charger 110 onto the transfer paper. After the image transfer is completed, the transfer paper is separated by the separation charger 111 from the photoreceptor drum 105 and guided by a conveyer belt 121 to a fixer 122 where the toner image is fixed by pressurizing and heating. Then the transfer paper is discharged by a discharge roller 123 from the copying machine body 100. In addition, the surface of the photoreceptor drum 105 is cleaned by the cleaning device 112.

The copying machine body 100 is equipped with a deck 124 capable of accommodating, for instance, 4,000 sheets of transfer paper. The lifter 125 of the deck 124 rises in proportion to the quantity of transfer paper so that the transfer paper always abuts against a paper feed roller 126.

The transfer paper sent out of the discharge roller 123 is guided by a paper discharge flapper 127 to either a two-side multiple recording side or a discharge side. Numeral 128 denotes a lower convey path used to turn over the transfer paper sent out of the discharge roller 123 by means of a reversing path 129 and to guide the paper to a paper refeed tray 130.

Numeral 131 denotes a multiple flapper for switching a two-side multiple recording path. When this flapper is turned left, the transfer paper is not guided to the reversing path 129 but directly guided to the lower convey path 128. Numeral 132 denotes a paper feed roller for supplying transfer paper via a path 133 toward the photoreceptor drum 105, and 134 a discharge roller for discharging the transfer paper switched to the discharge side by the discharge flapper 127 outside, the discharge roller being disposed in the vicinity of the discharge flapper 127.

At the time of two-side recording (two-side copying) and multiple recording (multiple copying), the discharge flapper 127 is raised and the copied transfer paper that has been turned over is delivered via the reversing path 129 and the lower convey path 128 onto the paper refeed tray. The multiple flapper 131 is turned right at the time of two-side recording, whereas it is turned left at the time of multiple recording. Then the transfer paper on the paper refeed tray 130 is guided by the paper feed roller 132 via the path 133 to the resist roller 120 sheet by sheet from the bottom.

When the reversed transfer paper is discharged from the copying machine body 100, the discharge flapper 127 is lifted and the flapper 131 is brought down to the right. The copied transfer paper is conveyed to the convey path side 129 and then to the side of a second feed roller 141 by means of a reverse roller 142 after the trailing end of the transfer paper has passed a first feed roller 140. Further, the transfer paper is turned over by the discharge roller 134 before being discharged from the machine body.

An operating panel will subsequently be described.

Figure 4:
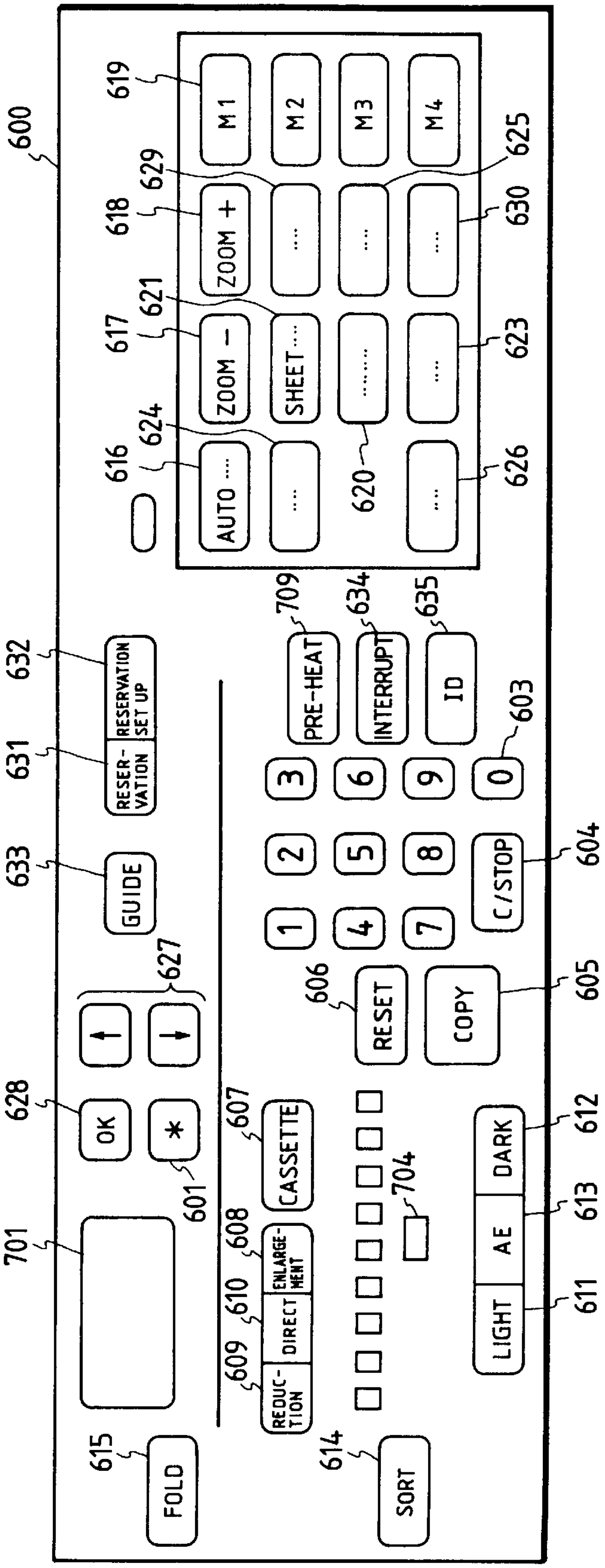
FIG. 4 is an external view of an operating panel embodying the present invention.

FIG. 4 is an external view of an operating panel 600 of the copying machine body 100.

Numeral 601 denotes an asterisk (*) key for use when the operator sets a binding margin and the size of erasing an original frame in a set mode, 627 a cursor key for use when a set item in the set mode is selected, 628 an OK key for use when the set contents in the set mode is decided.

Numeral 606 denotes an auto reset key to be pressed when a standard mode is restored. This auto reset key 606 is also pressed when an auto shut-off condition is set back to the standard mode.

Numeral 605 denotes a copy start key to be pressed when copying is started.

Numeral 604 denotes a clear/stop key which functions as a clear key during standby and as a stopper during the recording operation. The clear/stop key 604 is pressed to release the set number of sheets of paper or interrupt the continuous copying operation. When this key is pressed, the copying operation is stopped after the termination of what is involved.

Numeral 603 denotes ten keys to be pressed when the number of copies is set and to be also used to set the asterisk (*) mode. Numeral 619 denotes memory keys by which modes for frequent used by the user can be registered. In this case, there are four modes M1–M4 that can be recorded.

Numerals 611, 612 denote copy density keys to be pressed when the copy density is manually adjusted. Numeral 613 denotes an AE key to be pressed when the copy density is automatically adjusted in proportion to the density of an original or when AE (automatic exposure adjustment) is released so as to switch AE to manual density adjustment.

Numeral 607 denotes a copying paper selection key to be pressed when an upper row paper lifter 119, a lower row paper lifter 115, the paper deck 124, or a multiple manual paper feed 150 is chosen. While an original remains on the RDF 200, this copying paper selection key 607 may be used to select APS (automatic paper cassette selection). When the APS is selected, a cassette equal in size to the original is automatically selected.

Numeral 610 denotes an equimultiple key to be pressed when an equimultiple (full-scale) copy is taken. Numeral 616 denotes an auto variable multiple key to be pressed when an original image is automatically adjusted to the size of predetermined transfer paper for reduction or magnification.

Numeral 626 denotes a two-side key to be pressed to take a two-sided copy from a one-sided original, a two-sided copy from a two-sided original or a one-sided copy from a two-sided original. Numeral 625 denotes a binding margin key for use in preparing a predetermined length of binding margin on the left-hand side of transfer paper. Numeral 624 denotes a photographic key to be pressed when a photographic original is copied. Numeral 623 denotes a multiple key to be pressed to prepare (synthesize) an image on the same side of transfer paper from two different originals.

Numeral 620 denotes an original frame erasing key to be pressed when the user erases the frame of an original of fixed size, which is set by the asterisk key 601. Numeral 621 denotes a sheet frame erasing key to be pressed when the frame of an original is erased in conformity with the size of copying paper.

Numeral 629 denotes a cover mode set key to be used for preparing a cover and a back cover, and inserting a partition sheet. Numeral 630 denotes a continuous paging key to be used when the left- and right-hand sides of a spread hook are continuously copied.

Numeral 614 denotes a discharge method sort key for use in selecting a stable sorting, sorting or group discharging method. While the stable sorter 300 is kept connected, it is possible to release the selection of a stable sorting mode, sorting mode or grouping mode, or otherwise the selection mode itself.

Numeral 631 denotes a reservation key to be used when a copy mode with respect to the original reserved and mounted on a reservation tray 210 and when the reservation setting is released. Numeral 632 denotes a reservation set key to be used as a determination key at the time a reservation mode is set.

Numeral 633 denotes a guide key to be used when a description of the function of each key is displayed on a message display 701.

Numeral 701 denotes the message display for displaying copying and communication data or a liquid crystal display (LCD) capable of displaying characters and figures with 96×129 dots. The message display 701 is to display, for instance, the number of copies set by the ten keys 603; the copying scale factor set by fixed multiple varying keys 608, 609, the equimultiple key 610 and zooming keys 617, 618; the paper size selected by the copying paper selection key 607; a message indicating the state of the copying machine body 100; a guide message indicating operational steps; and contents of other modes to be set.

Numeral 704 denotes an AE indicator to be lighted when AE (for automatic exposure adjustment) is selected by the AE key. Numeral 709 denotes a pre-heat indicator to be lighted in the pre-heat state.

When the RDF 200 is used in the standard mode, the set conditions include one sheet of copying paper, the density AE mode, auto paper selection, equimultiple, and one-sided copying from a one-sided original. When the RDF 200 is not used in the standard mode, the conditions include one sheet of copying paper, a density manual mode, equimultiple, one-sided copying from a one-sided original. The difference between the use and not use of the RDF 200 is ascribed to the fact that whether or not an original is set on the RDF 200.

Figure 5:
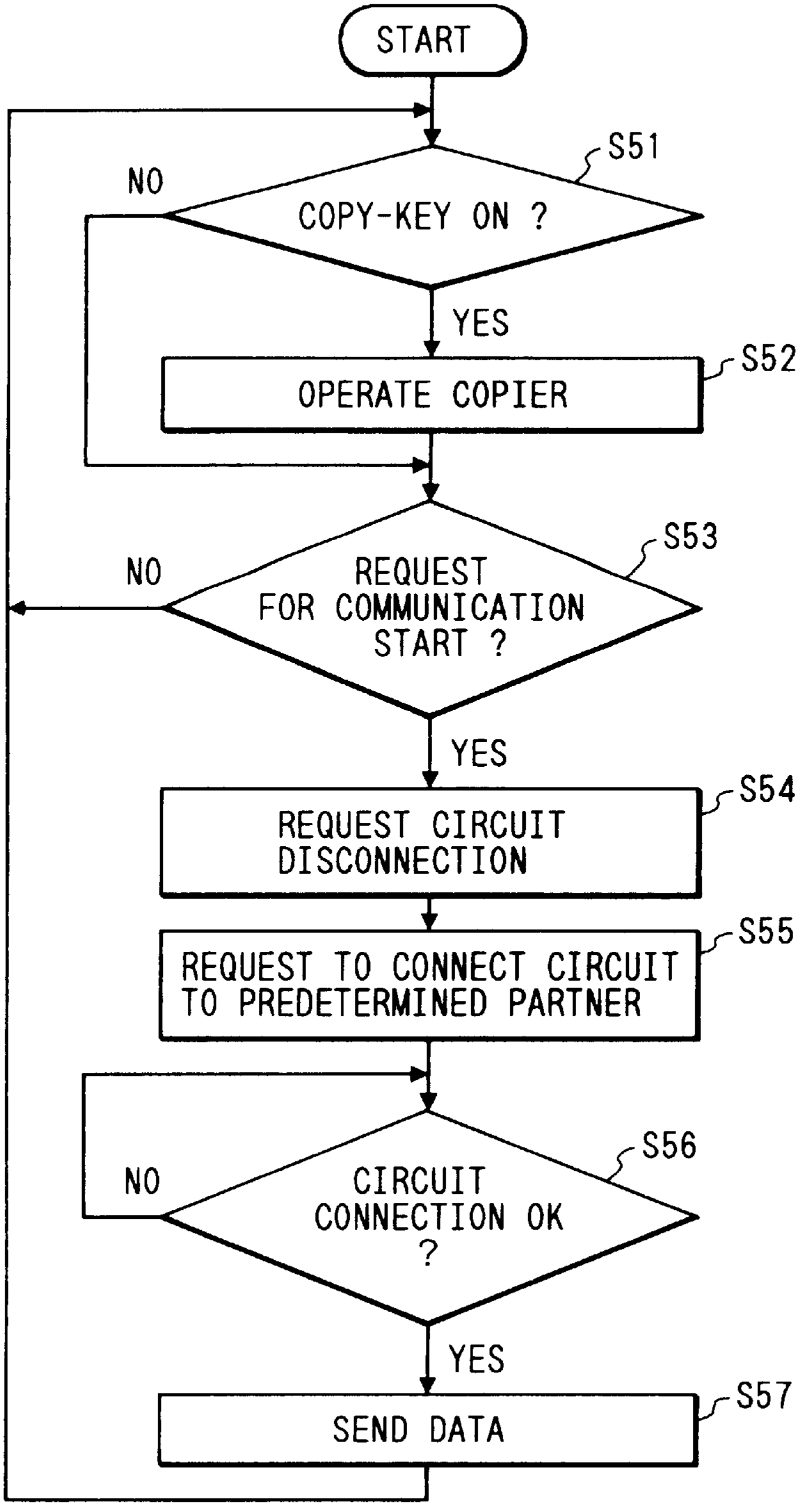
FIG. 5 is a control flowchart of the first embodiment.

A description will subsequently be given of communication control through the communication circuit of the first embodiment. FIG. 5 is a flowchart illustrating control of the CPU 801 exerted when the communication circuit is used for communication.

First, a decision is made on whether or not the copy key 605 is held down (Step S51) and the copying operation is performed where it is held down (Step S52). After the termination of the copying operation, a decision is made on the presence or absence of a request for a communication start (Step S53) and if the request therefor exists, a request for circuit disconnection is directed to the communication controller 900 (Step S54). Then referring to the RAM 803 stored with communication partners, the communication controller 900 is requested to connect a partner via the communication circuit (Step S55). Predetermined data is sent out (Step S57) after the connection with the circuit is confirmed (Step S56). On the termination of the data transmission, turning the copy key (605) on is waited for again (Step S51).

In this way, only the prestored communication partner is connected in reply to the request for a communication start made via the communication circuit under the control of the CPU 801, so that no data is obtainable even though a request for data transmission is made from the outside.

Figure 6:
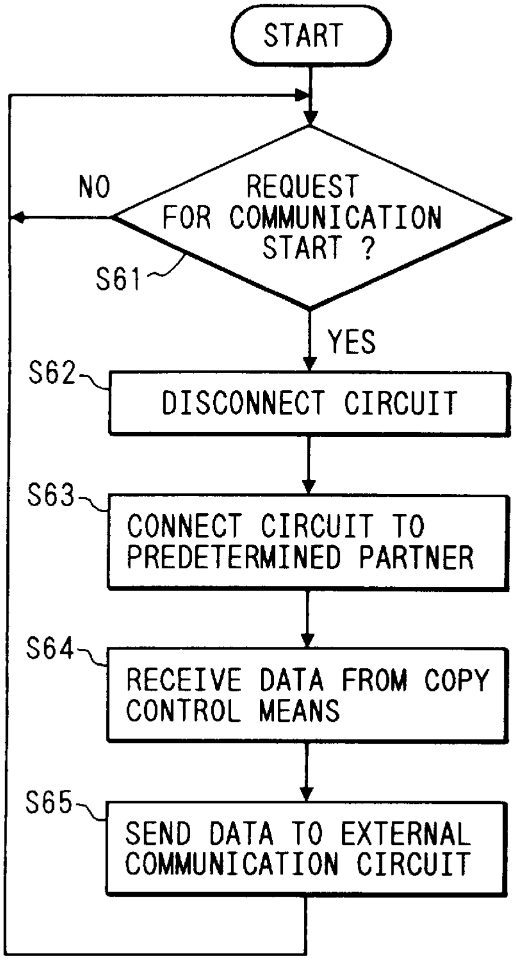
FIG. 6 is a control flowchart of the second embodiment.

FIG. 6 is a flowchart of the second embodiment, illustrating control of the CPU 901 exerted when the communication circuit is used for communication.

First, a request for a communication start via the communication circuit from the outside is waited for (Step S61) and if the request therefor exists, the circuit is disconnected once (Step S62). Referring to the RAM 903 stored with communication partners, a predetermined partner is then connected via the communication circuit (Step S63). After the connection with the communication circuit is effected, data to be sent out of the copy controller 800 is received (Step S64) and subsequently delivered via the communication circuit to the partner (Step S65). After the termination of data transmission, a request for a communication start via the-communication circuit from the outside is waited for again.

Communication with the prestored partner can thus be established through the above-mentioned control operation.

In this way, the copying machine is capable of performing the copying operation under the control of copy control means and of transmitting and receiving data via the communication circuit under the control of the communication control means.

When a request for a communication start is received by means for detecting the request therefor from the external communication circuit by following the procedure for the communication start, data is transmitted to the communication partner connected through a series of steps taken by circuit disconnection means to cut the connection with the external communication circuit once under the control of communication reconnection control means and then by external circuit connection means to connect the external communication circuit to the partner stored in communication partner storage means. Data and the like can thus be transmitted to only a predetermined partner. Therefore, a copying machine capable of excluding an improper access and greatly ensuring secrecy is provided.

Communication control of the third embodiment will subsequently be described.

Figure 7:
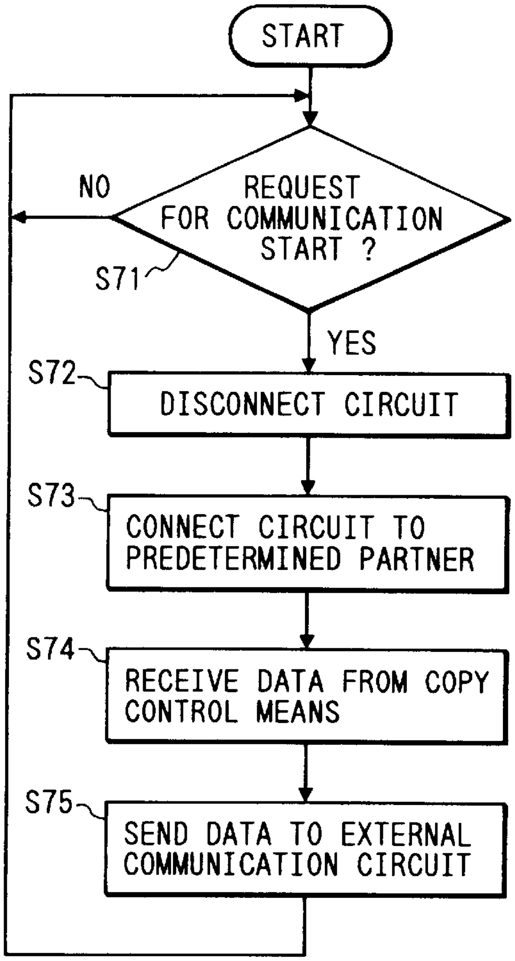
FIG. 7 is a control flowchart of the third embodiment.

FIG. 7 is a flowchart of communication control to be exerted by the CPU 901.

First, a request for a communication start via the communication circuit 908 is waited for (Step S71) and if the request therefor exists, the circuit is disconnected once (Step S72). Referring to the RAM 903 stored with communication partners, a predetermined partner is then connected via the communication circuit (Step S73). After the connection with the communication circuit is effected, data to be sent out of the copy controller 800 is received (Step S74) and subsequently delivered via the communication circuit 908 to the partner (Step S75). After the termination of data transmission, a request for a communication start via the communication circuit 908 from the outside is waited for again (Step S71).

Figure 8:
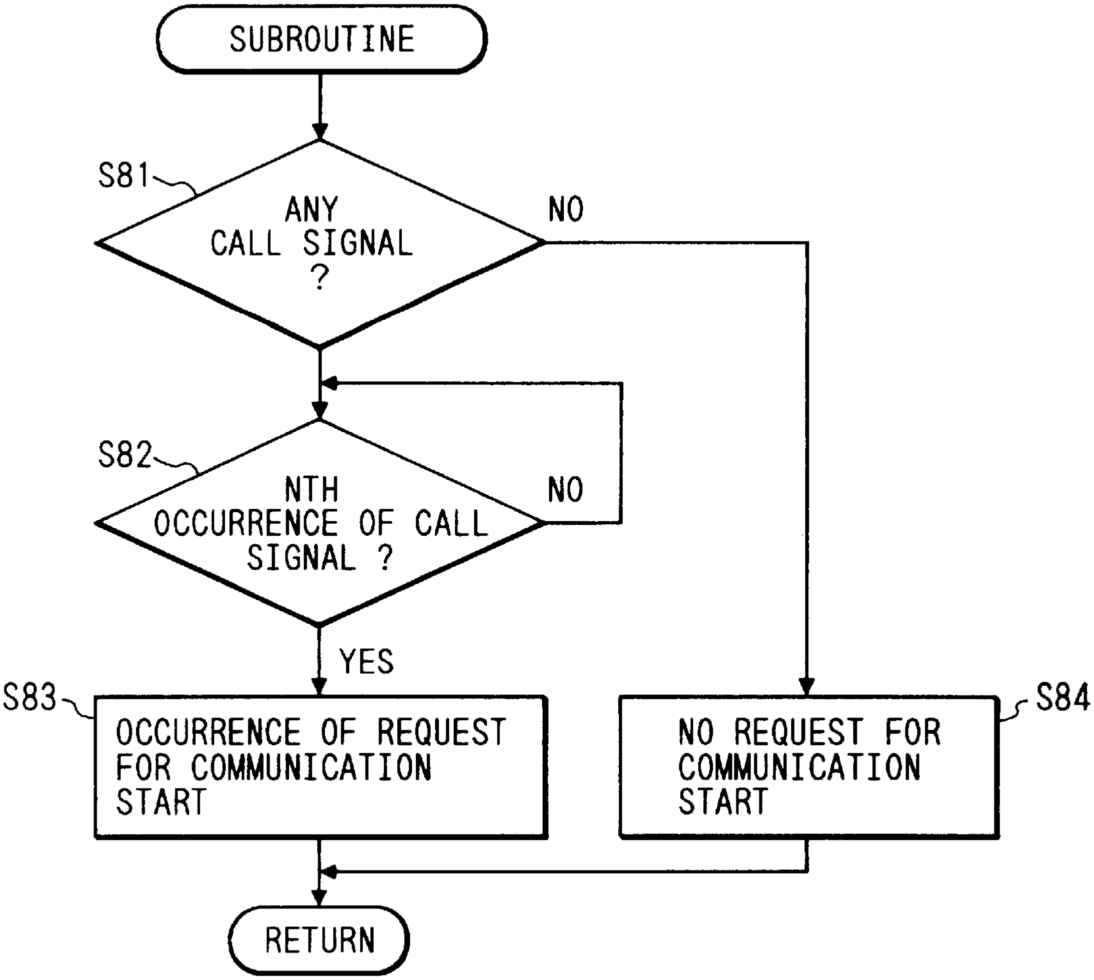
FIG. 8 is a control flowchart of a subroutine of the third embodiment.

FIG. 8 is a control flowchart illustrating a subroutine for detecting the request for a communication start from the communication circuit 908.

First, a decision is made on whether or not a call signal is received (Step S81). When no call signal is received, a return instruction is restored at no request for the communication start (Step S84). If there exists the call signal, the number of continuous call signals is monitored and counted up to the Nth occurrence of the call signal (Step S82). The return instruction is then restored with the occurrence of the request for the communication start (Step S83).

With the above-mentioned control, a request for a communication start can be detected by simple means and transmission of the request can be effected for only the partner stored in the storage means of communication partners.

In this way, the copying machine is controlled by the copy control means so as to perform the copying operation and is controlled by the communication control means so as to exchange data via the communication circuit with the external device.

When a request for a communication start is received by means for detecting the request therefor by detecting the call signal repeated a predetermined number of times from the external communication circuit by following the procedure for the communication start, data is transmitted to the communication partner connected through a series of steps taken by the circuit disconnection means to cut the connection with the external communication circuit once under the control of the communication reconnection control means and then by the external circuit connection means to connect the external communication circuit to the partner stored in the communication partner storage means. Data and the like can simply be transmitted to only a predetermined partner without the necessity of identifying the ID and the password of the partner requesting a communication start, the troublesome procedure for a specific protocol for recognition, and the storage means therefor. Consequently, a copying machine capable of excluding an improper access and greatly ensuring secrecy is provided.

Communication control of the fourth embodiment will subsequently be described.

Figure 9:
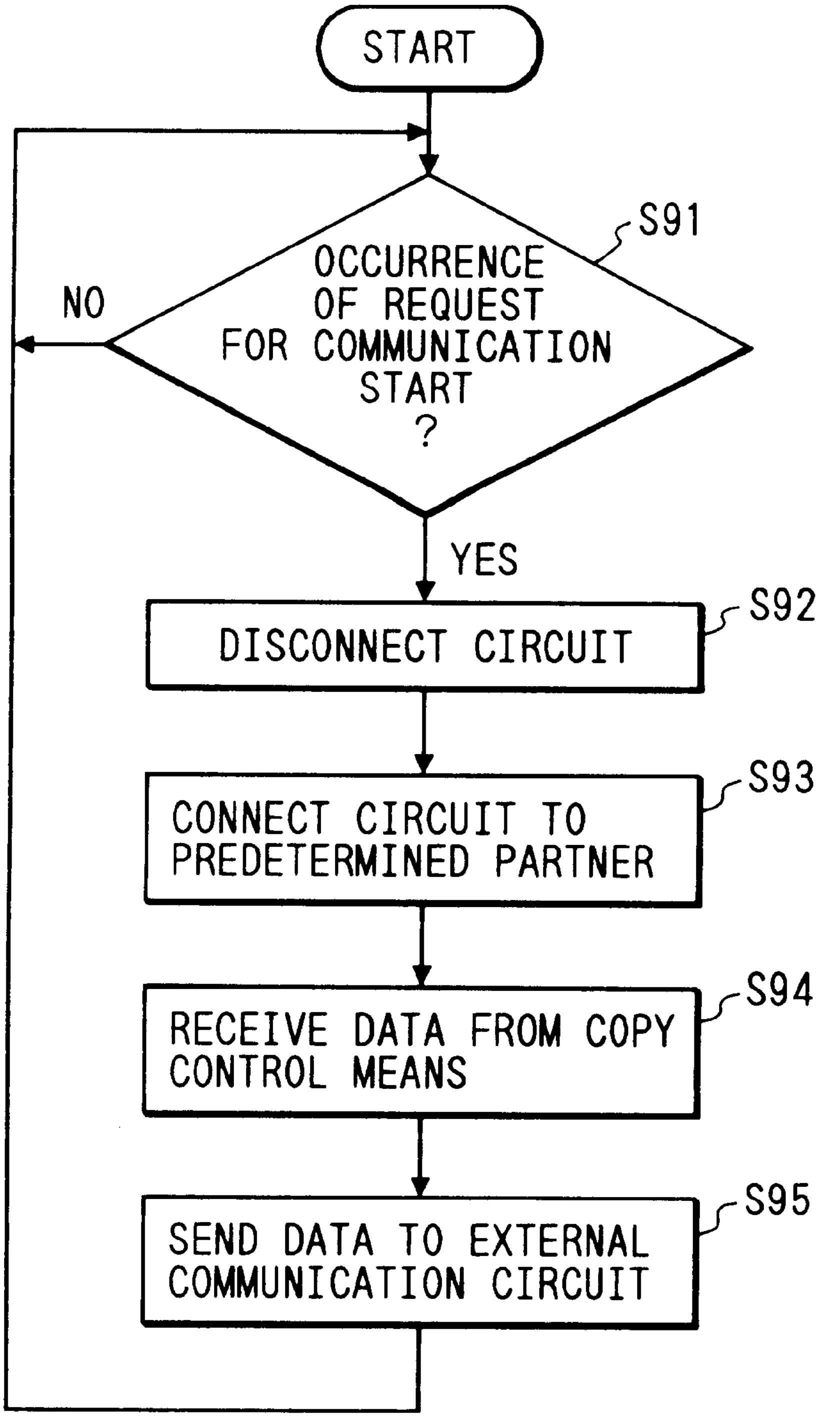
FIG. 9 is a control flowchart of the fourth embodiment.

FIG. 9 is a flowchart of communication control to be exerted by the communication controller 900.

First, a request for a communication start via the communication circuit 908 is wanted for (step S91) and if the request therefor exists, the circuit is disconnected once by the NCU 906 after the contents thereof are identified (Step S92). A predetermined partner corresponding to the request: for the communication start and stored in the RAM 903 is then connected by the NCU 906 to the communication circuit (Step S93). Data to be sent out of the copy controller 800 is then received (Step S94) and subsequently delivered via the communication circuit 908 to the partner (Step S95). After the termination of data transmission, a request for a communication start via the communication circuit 908 is waited for again.

Figure 10:
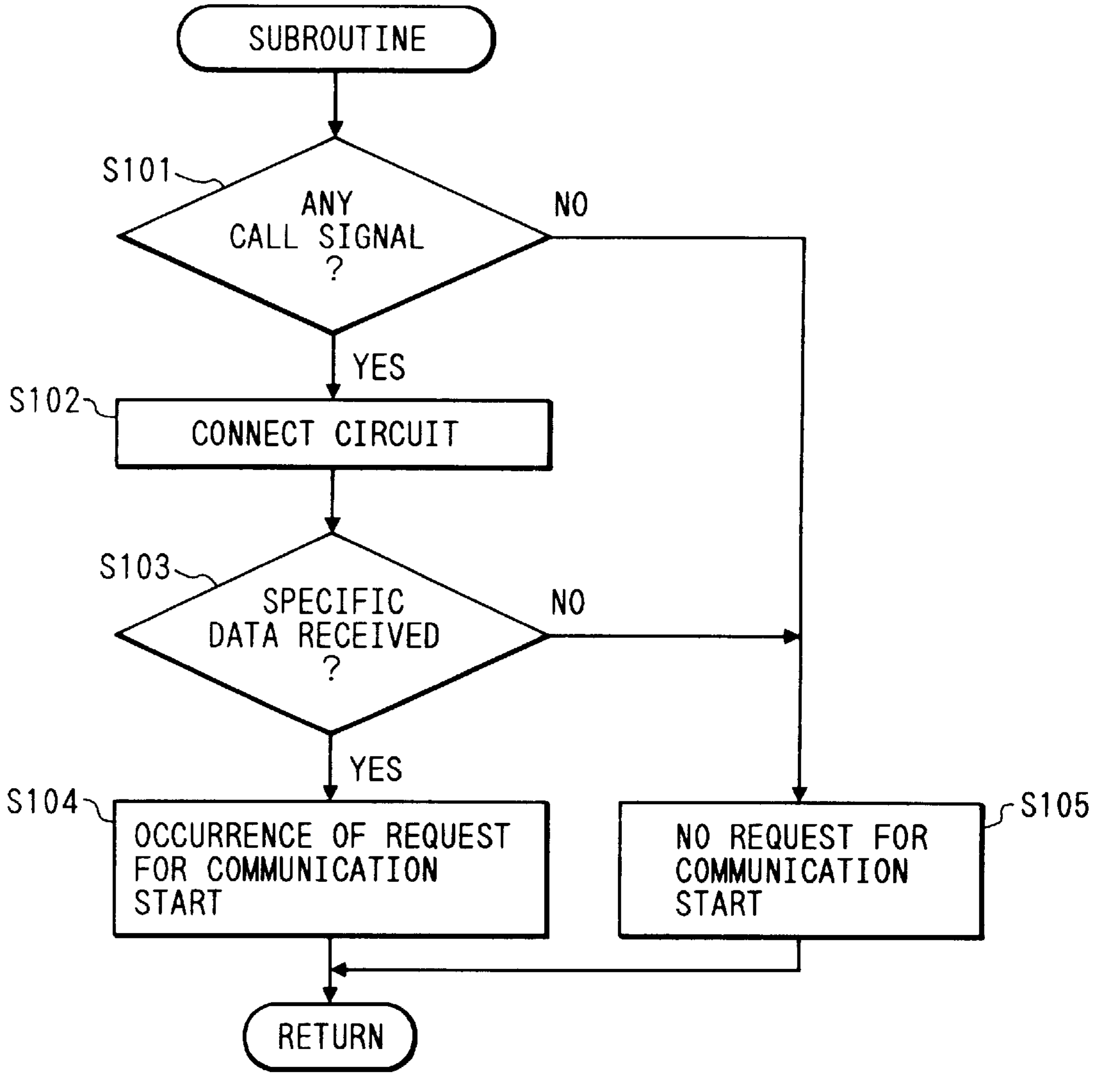
FIG. 10 is a control flowchart of a subroutine of the fourth embodiment.

FIG. 10 is a control flowchart illustrating a subroutine for detecting the request for a communication start from the communication circuit 908 at Step S91.

First, a decision is made on whether or not a call signal is received (Step S101). When no call signal is received, a return instruction is restored at no request for a communication start (Step S105). If there exists the call signal, the circuit is connected (Step S102) and a decision is made on whether or not the data initially received in a predetermined specific one (Step S103). The return instruction is then restored with the occurrence of the request for the communication start (Step S104) and the return instruction is also restored at no request for a communication start when the data received is not the specific one (Step S105).

When a request for a communication start is received by the copying machine from the external communication circuit, the communication control means detects a partner requesting communication from the specific data in the signal requesting the communication start via the means for detecting a request for a communication start, cuts the connection with the external communication circuit once, connects the circuit to the communication partner stored in the storage means of communication partners, and effects data transmission from the copy control means. As a result, data can be transmitted to only the predetermined partner stored in the storage means of communication partners, judging from the specific data contained in the signal requesting a communication start without the necessity of identifying the ID and the password of the partner requesting a communication start and of the troublesome procedure for a specific protocol for recognition. Therefore, procedures for requesting data communication and decision-making thereon are simplified and facilitated. The means for storing IDs and passwords can also be dispensed with. Moreover, data is prevented from being inadvertently transmitted to partners other than those stored in the storage means of communication partners.

The present invention may be applicable to not only the copying machines in the foregoing embodiments but also image forming apparatus such as printers, facsimiles and electronic files. In addition to communication circuits, radio and optical communications may also be employed. Moreover, those embodiments above may be implemented in combination.

What is claimed is:

1. A data communication apparatus comprising:

input means communicating with an image forming apparatus for inputting data from the image forming apparatus;

memory means for storing the data input by said input means;

communication means communicating with an external apparatus located at a remote location and for transmitting the data stored in said memory means to the external apparatus; and control means for controlling operation of said input means, memory means and communication means, said control means controlling said input means to input the data from the image forming apparatus and controlling said memory means to store the input data when said communication means receives a request for data communication from the external apparatus, said control means controlling said communication means to disconnect a communication with the external apparatus when said communication means receives a request for data communication from the external apparatus, then controls said communication means to connect a communication with a predetermined external apparatus, and subsequently controls said communication means to transmit the data stored in said memory means to the predetermined external apparatus.

2. A data communication apparatus as claimed in claim 1, wherein said image forming apparatus is a copier.

3. An apparatus according to claim 1, further comprising determining means for determining whether or not a request for data communication is received.

4. An apparatus according to claim 1, further comprising storage means for storing information designating the predetermined external apparatus to which the data is transmitted by said communication means.

5. A data communication method for a data communication apparatus which communicates with an external apparatus located at a location remote from the data communication apparatus, the data communication apparatus being connected to an image forming apparatus, said method comprising the steps of:

receiving a request for data communication from the external apparatus;

disconnecting a communication with the external apparatus;

connecting a communication with a predetermined external apparatus;

inputting data from the image forming apparatus, when the request for data communication is received from the external apparatus;

storing the data input from the image forming apparatus in said inputting step; and transmitting the data stored in said storing step to the predetermined external apparatus connected to the data communication apparatus in said connecting step.

6. A method according to claim 5, further comprising the step of determining whether or not a request for data communication is received.

7. A method according to claim 5, further comprising the step of storing information designating the predetermined external apparatus to which the data is transmitted.

8. A data communication method in a system comprising a data communication apparatus and an external apparatus located at a location remote from the data communication apparatus, the data communication apparatus being connected to an image forming apparatus, said method comprising the steps of:

transmitting a request for data communication from the external apparatus to the data communication apparatus;

determining whether or not there is a request for data communication at the data communication apparatus;

disconnecting a communication between the data communication apparatus and the external apparatus when said determining step determines that there is a request for data communication;

connecting a communication between the data communication apparatus and a predetermined external apparatus;

inputting data from the image forming apparatus when said determining step determines that there is a request for data communication;

storing the data input from the image forming apparatus in said inputting step; and transmitting the data stored in said storing step from the data communication apparatus to the predetermined external apparatus connected to the data communication apparatus in said connecting step.

9. A method according to claim 8, further comprising the step of storing information designating the predetermined external apparatus to which the data is transmitted.

* * * * *

UNITED STATES PATENT AND TRADEMARK OFFICE
CERTIFICATE OF CORRECTION

PATENT NO. : 6,064,915
DATED : May 16, 2000
INVENTOR(S) : Tokuharu Kaneko, et al.

It is certified that error appears in the above-identified patent and that said Letters Patent is hereby corrected as shown below:

Title page,
Item [56], References Cited,

U.S. PATENT DOCUMENTS

"4,752,950 6/1988" should read -- 4,752,950 7/1988 --.
""Kamamura et al." should read -- Kawamura et al. --.

Column 7,
Line 33, "the-communication" should read -- the communication --.

Signed and Sealed this

Sixth Day of November, 2001

*Attest:*

Nicholas P. Godici

*Attesting Officer*

NICHOLAS P. GODICI
*Acting Director of the United States Patent and Trademark Office*